No. 12,489. REISSUED MAY 22, 1906.

F. W. REINDEL.

TEMPORARY BINDER.

APPLICATION FILED APR. 17, 1905.

Witnesses,

E. M. Klatcher

Inventor,

Frederick W. Reindel

By Louis R. Gillson

Atty.

UNITED STATES PATENT OFFICE.

FREDERICK W. REINDEL, OF CLEVELAND, OHIO, ASSIGNOR TO PLEW & MOTTER, OF CHICAGO, ILLINOIS, A COPARTNERSHIP.

TEMPORARY BINDER.

No. 12,489. Specification of Reissued Letters Patent. Reissued May 22, 1906.

Original No. 715,865, dated December 16, 1902. Application for reissue filed April 17, 1905. Serial No. 256,156.

*To all whom it may concern:*

Be it known that I, FREDERICK W. REINDEL, a citizen of the United States, and a resident of Cleveland, county of Cuyahoga, and State of Ohio, have invented a new and useful Improvement in Temporary Binders, of which the following is a specification, the principle of the invention being herein explained and the best mode in which I have contemplated applying that principle, so as to distinguish it from other inventions.

My invention relates to binders for temporarily binding loose leaves, its object being to provide means for such purpose easily manipulated and of durable and economical construction.

Said invention consists of means hereinafter fully described, and specifically set forth in the claims.

The annexed drawings and the following description set forth in detail certain mechanism embodying the invention, such disclosed means constituting but one of various mechanical forms in which the principle of the invention may be used.

Figure 1:
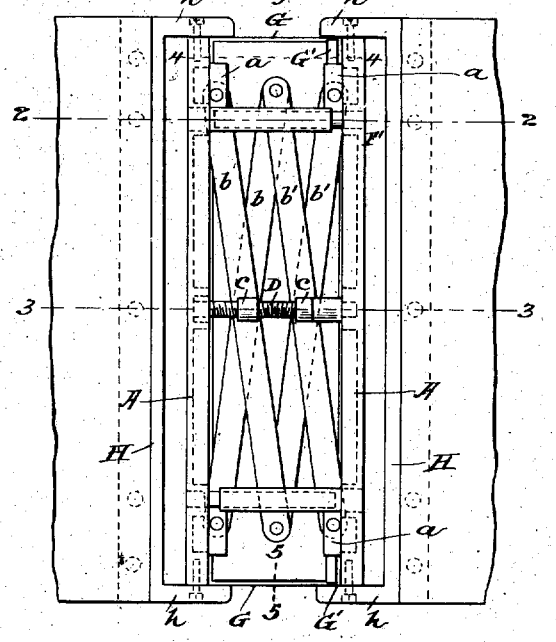
Figure 2:
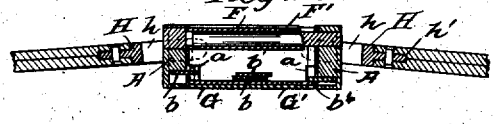
Figure 4:
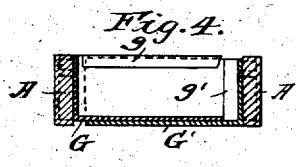
Figure 3:
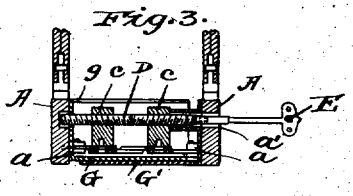
Figure 5:
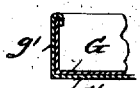
Figure 6:
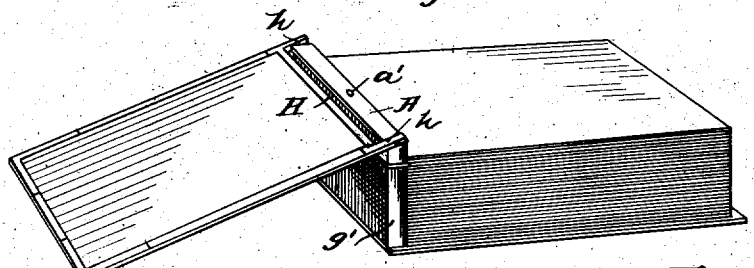

In said annexed drawings, Figure 1 represents a plan view of back mechanism embodying my invention, showing parts of the cover secured to the hinges connected therewith. Fig. 2 represents a cross-section taken upon the plane indicated by line 2 2, Fig. 1. Fig. 3 represents a cross-section taken upon the plane indicated by line 3 3, Fig. 1, showing the hinge in an upright position. Fig. 4 represents a cross-section taken upon the plane indicated by line 4 4, Fig. 1, with hinges removed. Fig. 5 represents a partial section taken upon the plane indicated by line 5 5, Fig. 1. Fig. 6 represents a perspective view of a loose-leaf ledger embodying my invention, showing one cover in its open position.

Two lateral parallel members A A, preferably of metal, are each provided with two inwardly-extending lugs *a*, upon which are pivoted the outer ends of two pairs of cross-bars *b b* and *b′ b′* of equal length, the contiguous inner ends of such bars being pivoted to each other, as shown in Fig. 1. Said members are suitably recessed to allow proper play of said bars, as shown in Fig. 3. Two nuts *c c* are pivotally secured one each at the crossing-points of the two pairs of bars. Said nuts are provided with threads of opposite trend and are respectively engaged by two threads of corresponding trend on a screw D, one end of which is squared, projects through an aperture *a′*, formed in one member A, and may be engaged and turned by a key E. Telescoping sleeves F and pins F′ are secured in the usual manner to the inner faces of the two members for receiving the loose leaves. Upon such inner faces, respectively, are further secured two casing members G G′, adapted to slide one upon the other, the one formed with a guiding and protecting bead *g*, Fig. 4, upon its two end portions *g′*, such casing forming the extreme back of the ledger and ends of such back and extending between the two members A, as shown in Fig. 2, thereby neatly inclosing the mechanism at such back and ends.

Two metal hinge members H H are provided, one being secured to each of the lateral members A A. Each hinge member is formed with two arms *h h*, forming a yoke, one at each end thereof, said arms being pivoted to the ends of such lateral members, so as to include same between them, as shown, this permitting the hinge members and cover to be turned back, as shown in Fig. 6, without contacting the back of the ledger and relieving the hinge members of substantially all strain when such book is open upon a table or supporting-surface.

By turning the key in one direction the members A A may be caused to retract relatively to each other, their parallel position being maintained through such movement by the bars *b* and *b′*, as is readily understood. Being so retracted the members may be caused to approach by turning the key in the opposite direction.

The hinge members are each formed with a web *h′*, to which the covers are riveted, as shown in Fig. 2.

Other methods of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In a temporary binder, the combination with back mechanism comprising two relatively retractable lateral members and retracting mechanism therefor, of two cover-hinge members each comprising a yoke having two arms, said arms including said lateral members and pivoted to the ends thereof.

2. In a temporary binder, the combina- with back mechanism comprising two parallel lateral members, a series of pivoted cross-bars connecting such members and adapted to make them retractable, and retracting means, said bars adapted to maintain the parallel position of such members, of two hinge members each comprising a yoke having two arms, said arms including said lateral members and pivoted to the ends thereof.

3. In a temporary binder, the combination with back mechanism, and relatively retractable casing members, of two cover members, each provided with a yoke having two end arms, the arms of each such cover member being pivoted to the respective ends of one such casing member.

4. In a temporary binder, back mechanism comprising two parallel lateral members, two pairs of cross-bars, the two outer ends of the bars of each pair pivoted to a lateral member, the two contiguous inner ends of each pair pivoted to each other, a nut pivotally secured at the crossing-point of the two bars of each pair, and a screw having two threads of opposite trend respectively engaging such nuts.

5. In a mechanism of the class described, the combination of a binding means comprising two relatively movable side members, crossed levers pivoted at their longitudinal centers having their ends operatively connected with such side members, a back connected with the side members, and a screw operatively connected with such levers for operating them and thereby the side members, substantially as described.

6. In a loose-leaf binder, the combination of a pair of side binder-frames provided with binder-pin mechanism thereon, crossed levers pivoted together and having their ends operatively connected with such side binder-frames, and a screw operatively connected with such levers for operating them and thereby the side binder-frames, substantially as described.

7. In a mechanism of the class described, the combination of a binding means comprising two relatively movable members, crossed levers having their ends operatively connected to such side members and provided with means for engaging a screw, and a screw operatively connected with such levers for oscillating them and thereby operating the side members, substantially as described.

8. In a loose-leaf binder, the combination of a pair of side binder-frames provided with binder-pin mechanism thereon, crossed levers pivoted together and having their ends operatively connected with such side binder-frames, and a screw operatively connected with such levers for operating them and thereby the side binder-frames, substantially as described.

9. In a mechanism of the class described, the combination of two relatively movable side binder members, intersecting and pivoted levers having their ends operatively connected with said side members, a leverage mechanism operatively engaged with said crossed levers for moving the latter to change their angle of intersection and thereby effect the approach or retraction of said side members.

FREDERICK W. REINDEL.

Witnesses:
ROBERT F. SCHADE,
LOUIS K. GILLSON.